Patented Apr. 18, 1933

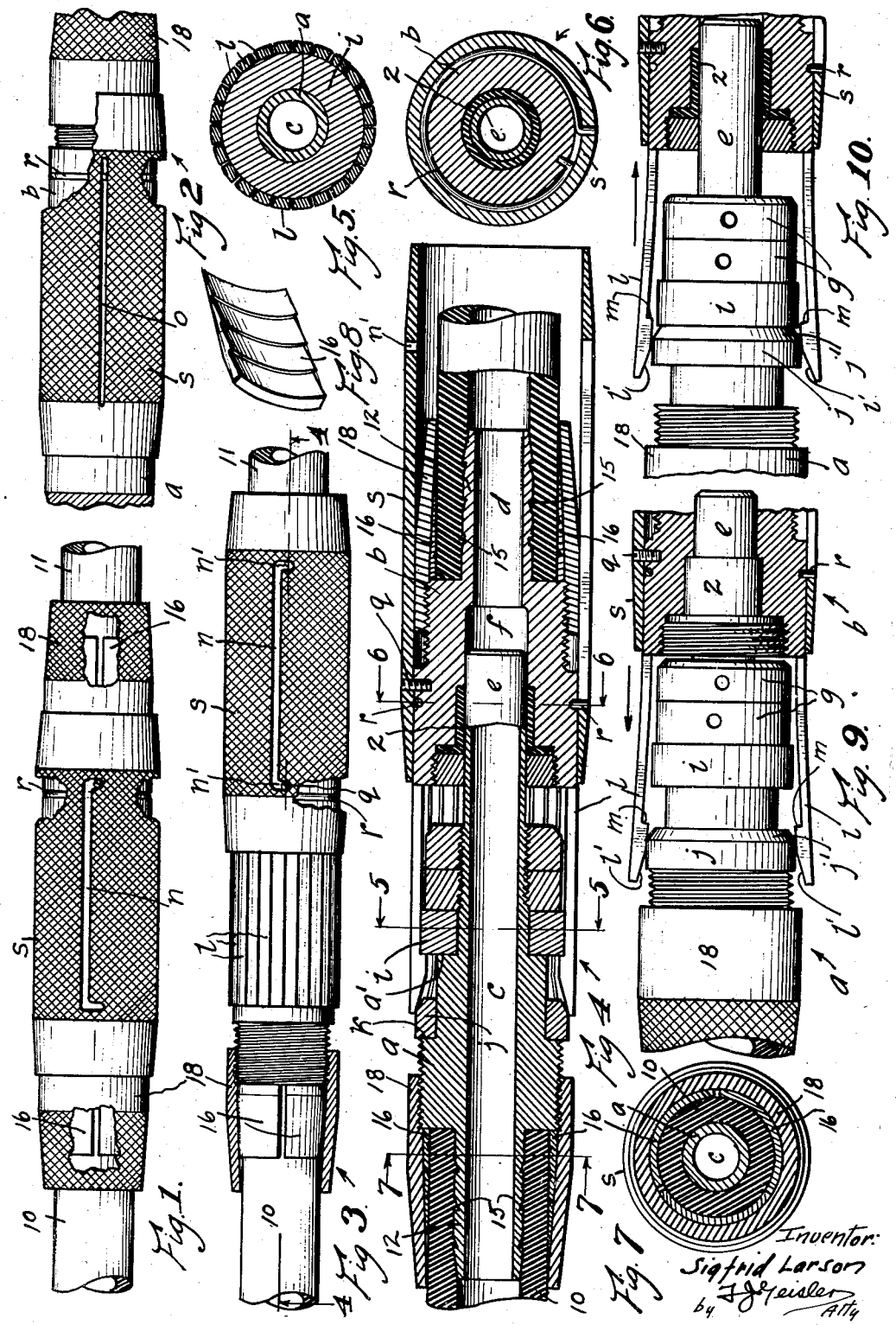

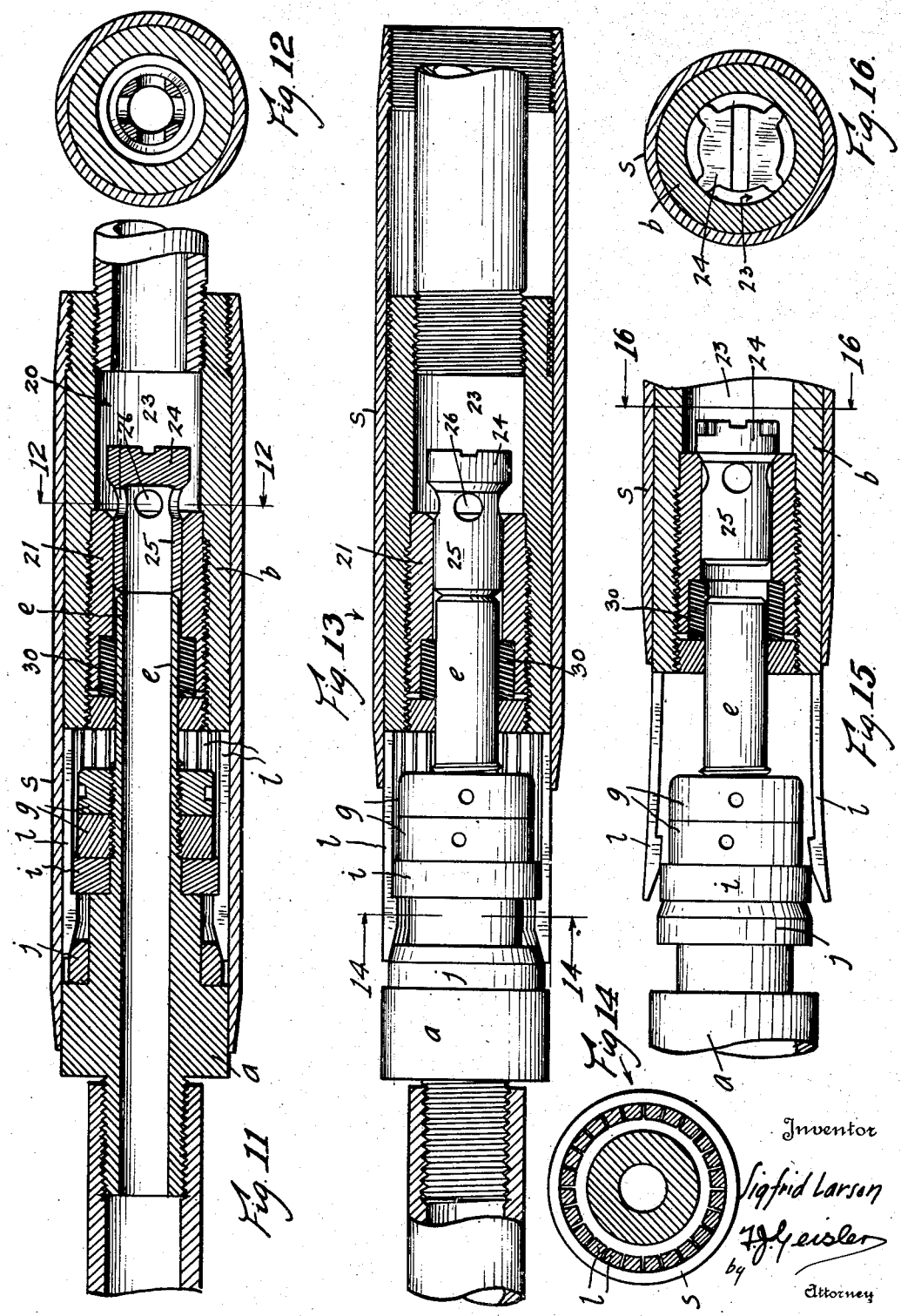

1,904,061

UNITED STATES PATENT OFFICE

SIGFRID LARSON, OF PORTLAND, OREGON

HOSE COUPLING

Application filed December 3, 1930. Serial No. 499,712.

My invention relates to hose couplings and the like.

The object of my invention is to provide a simple and practical hose coupling, the members of which may not only be positively locked together to prevent accidental separation, but also quickly and conveniently connected or disconnected without the use of auxiliary tools or having removal parts liable to be lost in service.

A further object of my invention is to provide a hose coupling adapted to permit one member to rotate relatively to the other without leaking, thereby to prevent twisting and kinking of the hose.

A still further object of my invention is to provide such a hose coupling with means adapted to automatically shut off the flow through the hose when the coupling members are separated.

I am aware that there are numerous hose couplings in use, but none within my knowledge have been provided with positive locking means such as I propose to provide and adapted to be conveniently connected and disconnected without requiring auxiliary tools or comprising removable parts. Further, none within my knowledge permit the coupling members to be relatively rotatable without leaking.

I attain my objects in a hose coupling comprising male and female members, the male member formed with a tubular extension, a valve member seated in the bore of said female member adapted to be unseated by said extension when the coupling members are assembled, collars mounted on the periphery of the male member, one of said collars being mounted adjacent the base of said extension and the other slidably mounted inwardly of said first collar, the female member provided with peripheral, longitudinally extending fingers adapted to engage with said collar to connect said coupling members, and to be disconnected by merely pressing the male member inwardly against the female member and then withdrawing the male member therefrom.

A still further object of my invention is to provide a hose coupling having simple and positive means for clamping the hose ends to the respective coupling parts comprising tubular nipples provided on their outer ends adapted to be inserted in the end of a hose, a sleeve threaded on the outer ends of said coupling members enclosing said hose ends; segments positioned in said sleeve and adapted to bear on said hose ends, said nipple and said sleeve provided with annular notches on the sides bearing on said hose ends, the circumference of said segments being less than the circumference of the hose, whereby when said sleeve is threaded closely over said segments the latter are pressed firmly into the hose.

These and other incidental features of my invention, the details of construction, and mode of assembly are hereinafter fully described with reference to the accompanying drawings.

In the drawings:

Fig. 1 shows a side elevation of my hose coupling with parts broken away to disclose the details of construction;

Fig. 2 shows, similarly to Fig. 1, an elevation taken from the opposite side of my coupling;

Fig. 3 shows my hose coupling with the guard sleeve withdrawn preparatory to disconnecting the coupling members;

Fig. 4 shows a section taken on the line 4—4 of Fig. 3 and illustrates further details of construction;

Fig. 5 shows a transverse section taken on the line 5—5 of Fig. 4;

Fig. 6 shows a transverse section taken on the line 6—6 of Fig. 4;

Fig. 7 shows a transverse section taken on the line 7—7 of Fig. 4 illustrating the hose clamping means;

Fig. 8 shows a perspective view of one of the hose clamping elements;

Fig. 9 shows an enlarged fragmentary view partly in section and illustrates how the coupling members are connected;

Fig. 10 shows, in a similar view, how the coupling members are disconnected;

Fig. 11 shows, in a longitudinal section, a modification of my hose coupling provided with an automatic shut-off valve;

Fig. 12 shows a section taken on the line 12—12 of Fig. 11 and illustrates the radial ports in the valve member;

Fig. 13 shows this modification of my hose coupling when the members are connected;

Fig. 14 shows a section taken on the line 14—14 of Fig. 13;

Fig. 15 shows a further sectional view of this modification illustrating the position of the valve member when the coupling members are disconnected; and Fig. 16 shows a section taken on the line 16—16 of Fig. 15.

Referring now to Figs. 1 to 10, my hose coupling comprises male and female members $a$, $b$, having longitudinal passageways $c$, $d$, respectively. The male member $a$ is formed with an integral extension $e$ adapted to be received within an enlarged portion $f$ of the passageway $d$ of the female member $b$. Nuts $g$ are threaded on the member $a$ adjacent the base of the said extension which serve as means for holding a rotatably mounted collar $i$ of somewhat greater external diameter between them and a shoulder $a'$ formed on the member $a$ inwardly of the said nuts $g$.

A slidable collar $j$ of greater diameter than the collar $i$ and having a beveled edge $j'$ is also carried by the member $a$ between the collar $i$ and a shoulder $k$.

The female member $b$ is formed with a series of peripherally arranged, longitudinally extending spring-like fingers $l$, the ends of which are beveled as at $l'$ on the inner sides and provided with interior engaging lugs $m$. A packing 2 is provided at the open end of the enlargements $f$ of the passageway $c$.

By these means, the coupling members are connected one with the other by inserting the extension $e$ of the member $a$ into the enlarged portion $f$ of the passageway $d$ of the member $b$, see Fig. 9, until the fingers $l$ pass over the collar $i$ and the lugs $m$ engage the outer edge of the said collar $i$, see Fig. 4.

Thus, my hose coupling may be quickly and conveniently connected together, and the coupling members $a$, $b$, are relatively rotatable one within the other since the fingers $l$ are engaged with the rotatable collar $i$. Further, my coupling will not leak when connected, as the extension $e$ extends a substantial distance into the passageway $d$ and is further sealed by the packing 2.

A sleeve $s$ is slidably mounted on the member $b$ and is provided with longitudinal oppositely arranged slots $n$, $o$, the slot $n$ having offset ends $n'$. A projection $q$ is provided on the member $b$ riding in the slot $n$ and a coiled spring member $r$ is connected at one end in the member $b$, and at its end rides in the slot $o$.

By these means, the sleeve $s$ may be locked at either end of its limit of movement by rotating the latter so that the projection $q$ bears in the offset ends of the slot $n$ where it is held by the tension of the coil spring member $r$. The sleeve $s$, when in its forward position, see Fig. 1, holds the fingers $l$ closely against the collar $i$ so that they may not be inadvertently disengaged.

To disengage my hose coupling, the sleeve $s$ is drawn back to the position shown in Fig. 3 and the member $b$ is pressed against the member $a$ so that the shoulders $m$ of the fingers $l$ ride upon the beveled edges $j'$ of the collar $j$, see Fig. 9, after which the member $b$ is drawn away from the member $a$, the collar $j$ moving with the fingers $l$ so as to lift them over the collar $i$, see Fig. 10, so that my hose coupling is conveniently and quickly disengaged.

The outer ends of the coupling members $a$, $b$, are each provided with clamping means for connecting the hose ends 10, 11 thereto. Such means comprise tubular extensions or nipples 12 formed on the outer ends of the coupling members and provided with annular notches 15 having perpendicular faces which are turned inward toward the coupling members, see Fig. 5. Three or more cylindrical tapered segments 16 are provided, having notches 17 on their inner surfaces, having perpendicular faces which are also turned inward toward the coupling members. The segments 16 are arranged over the exterior of the hose ends, see Fig. 3, and tapered sleeves 18 are threaded on the outer ends of the coupling members and adapted to inclose said segments and draw them closely onto the hose, forcing the notches 15, 17 into the hose material, thus holding the hose ends more firmly, the greater the parting strain exerted on them.

In order to permit the segments 16 to be pressed radially against the hose and prevent the hose material from being pinched between their edges, I provide three or more, for, if only two segments are provided, the segments tend to move parallel to the hose when clamped against it by the sleeve 18, and thus pinch the hose between them, damaging the hose and preventing a fluid tight closure.

Further, to insure that the segments 16 will be pressed closely into the hose, I form them of less segmental width than the total diameter of the hose on which they are to be mounted, so that their edges will not be brought in contact when the segments are pressed into the hose and thus are held circumferentially spaced apart, and will be self-tightening once the sleeve 18 is tightened by hand, since under a parting strain the segments are drawn against the tapered sleeve and pressed more tightly into the hose, the greater the strain.

Referring now to Figs. 11 to 16, inclusive, I have shown a modification of my coupling in which I have provided an automatic shut-off valve carried by the female member $b$.

Otherwise the construction of this modification is unchanged and will not be again described, similar reference characters indicating similar parts with reference to Figs. 1 to 10.

In this modification, the passageway 20 of the female member is enlarged and a bushing 21 is threaded in its end, the bushing 21 serving to reduce the diameter so as to receive the extension $e$ of the male member $a$, see Fig. 11. The bushing is provided with a packing 30 on its outer end and is of less length than the passageway 20, forming a chamber 23, in which is located a valve member 24, provided with a cylindrical skirt 25 bearing in the said bushing and having ports 26 therein located adjacent its head.

I have provided the above described valve in the female member $b$ since it is the common practice to always connect the female member $b$ to the source of the fluid to be conducted through the hose. Thus, when the coupling is disconnected the pressure of the fluid will be against the valve member 24 and hold it closely against the bushing 21, shutting off the flow of the fluid therethrough, but when the coupling is assembled, the end of the extension $e$ of the member $a$ will bear against the skirt 25 of the valve member 24 and unseat it from the bushing, which serves as the valve seat, and the fluid may then flow through the ports 26 into the member $a$.

In this modification, I have shown my coupling provided with threaded outer ends to permit them to be connected to a pipe, but where desirable the hose clamping means, heretofore described, may be readily substituted.

Such construction is very desirable, for not only may the coupling be disconnected without turning the water or other fluid off at its source, but my coupling may be readily used as a substitute for the usual faucet or the like, for water hoses, by connecting the female member to the end of the water pipe. This would be especially useful in the case of garden hoses.

Further, in air hoses, with my automatic valve the hose may conveniently be disconnected from one air operated tool and connected to another, without the operator being required to go back to the source to shut off the flow, which is advantageous in construction work where the operator is working above the ground or in a relatively inaccessible place.

I claim:

1. A hose coupling comprising male and female members, two collars mounted one behind the other on the end of the male member, the inner of said collars being slidable and of greater exterior diameter than the outer collar, the female member formed with peripherally arranged longitudinally extending resilient fingers, the extremities of which form locking heads, the inner faces of which are beveled, whereby in coupling said members, said fingers ride over and engage with the outer of said collars and the further pushing of said members together causes said fingers to ride onto said inner collar and again spread and disengage said fingers.

2. A hose coupling comprising male and female members, two collars mounted one behind the other on the end of the male member, the inner of said collars being slidable and of greater exterior diameter than the outer collar, the outer collar being rotatable, the female member formed with peripherally arranged longitudinally extending resilient fingers, the extremities of which form locking heads, the inner faces of which are beveled, whereby in coupling said members, said fingers ride over and engage with the outer of said collars and the further pushing of said members together causes said fingers to ride onto said inner collar and again spread and disengage said fingers.

3. A hose coupling comprising male and female members, two collars mounted one behind the other on the end of the male member, the inner of said collars being slidable and of greater exterior diameter than the outer collar, the male member provided with a tubular extension adapted to be received in the bore of said female member in fluid tight contact, the female member formed with peripherally arranged longitudinally extending resilient fingers, the extremities of which form locking heads, the inner faces of which are beveled, whereby in coupling said members, said fingers ride over and engage with the outer of said collars and the further pushing of said members together causes said fingers to ride onto said inner collar and again spread and disengage said fingers.

4. A hose coupling comprising male and female members, two collars mounted one behind the other on the end of the male member, the inner of said collars being slidable and of greater exterior diameter than the outer collar, the outer collar being rotatable, said slidable collar being beveled on the side adjacent said outer collar, the female member formed with peripherally arranged longitudinally extending resilient fingers, the extremities of which form locking heads, the inner faces of which are beveled, whereby in coupling said members, said fingers ride over and engage with the outer of said collars and the further pushing of said members together causes said fingers to ride onto said inner collar and again spread and disengage said fingers.

5. A hose coupling comprising male and female members, two collars mounted one behind the other on the end of the male member, the inner of said collars being slidable and of greater exterior diameter than the outer collar, said slidable collar being beveled on the side adjacent said outer collar, the female member formed with peripherally arranged longitudinally extending resilient fingers, the extremities of which form locking heads, the inner faces of which are beveled, whereby in coupling said members, said fingers ride over and engage with the outer of said collars and the further pushing of said members together causes said fingers to ride onto said inner collar and again spread and disengage said fingers, a slidable locking sleeve carried by said female member adapted in one position to hold said fingers closely in engagement with said outer collar.

6. A hose coupling comprising male and female members, two collars mounted one behind the other on the end of the male member, the inner of said collars being slidable and of greater exterior diameter than the outer collar the outer collar being rotatable, the male member provided with a tubular extension adapted to be received in the bore of said female member in fluid tight contact, said slidable collar being beveled on the side adjacent said outer collar, the female member formed with peripherally arranged longitudinally extending resilient fingers, the extremities of which form locking heads, the inner faces of which are beveled, whereby in coupling said members, said fingers ride over and engage with the outer of said collars and the further pushing of said members together causes said fingers to ride onto said inner collar and again spread and disengage said fingers, a slidable locking sleeve carried by said female member adapted in one position to hold said fingers closely in engagement with said outer collar.

7. A hose coupling comprising male and female members, the male member provided with a tubular extension, the bore of said female member adapted to receive said extension, a valve member seated in said bore of the female member and adapted to be unseated by said extension when the coupling members are assembled, two collars mounted one behind the other on the end of said male member, the inner of said collars being slidable and of greater exterior diameter than the outer collar, the female member formed with peripherally arranged longitudinally extending resilient fingers, the extremities of which form locking heads, the inner faces of which are beveled, whereby in coupling said members, said fingers ride over and engage with the outer of said collars and the further pushing of said members together causes said fingers to ride onto said inner collar and again spread and disengage said fingers.

8. A hose coupling comprising male and female members, the male member provided with a tubular extension, the bore of said female member adapted to receive said extension, a valve member seated in said bore of the female member and adapted to be unseated by said extension when the coupling members are assembled, two collars mounted one behind the other on the end of said male member, the inner of said collars being slidable and of greater exterior diameter than the outer collar, the outer collar being rotatable, the female member formed with peripherally arranged longitudinally extending resilient fingers, the extremities of which form locking heads, the inner faces of which are beveled, whereby in coupling said members, said fingers ride over and engage with the outer of said collars and the further pushing of said members together causes said fingers to ride onto said inner collar and again spread and disengage said fingers.

9. A hose coupling comprising male and female members, the male member provided with a tubular extension, the bore of said female member adapted to receive said extension, a valve member seated in said bore, said valve member comprising a tubular sleeve having a head, ports provided in said sleeve adjacent said head, whereby when the coupling members are assembled, said valve member is moved outwardly by said extension and said ports are uncovered, two collars mounted one behind the other on the end of said male member, the inner of said collars being slidable and of greater exterior diameter than the outer collar, the female member formed with peripherally arranged longitudinally extending resilient fingers, the extremities of which form locking heads, the inner faces of which are beveled, whereby in coupling said members, said fingers ride over and engage with the outer of said collars and the further pushing of said members together causes said fingers to ride onto said inner collar and again spread and disengage said fingers.

SIGFRID LARSON.